April 26, 1960   JIRO HINO   2,933,995
SHUTTER APPARATUS FOR CAMERAS
Filed April 13, 1956   3 Sheets-Sheet 1

INVENTOR
Jiro Hino
BY Linton and Linton
ATTORNEYS

April 26, 1960  JIRO HINO  2,933,995
SHUTTER APPARATUS FOR CAMERAS
Filed April 13, 1956  3 Sheets-Sheet 2

INVENTOR
Jiro Hino
BY Linton and Linton
ATTORNEYS

April 26, 1960  JIRO HINO  2,933,995
SHUTTER APPARATUS FOR CAMERAS
Filed April 13, 1956  3 Sheets-Sheet 3
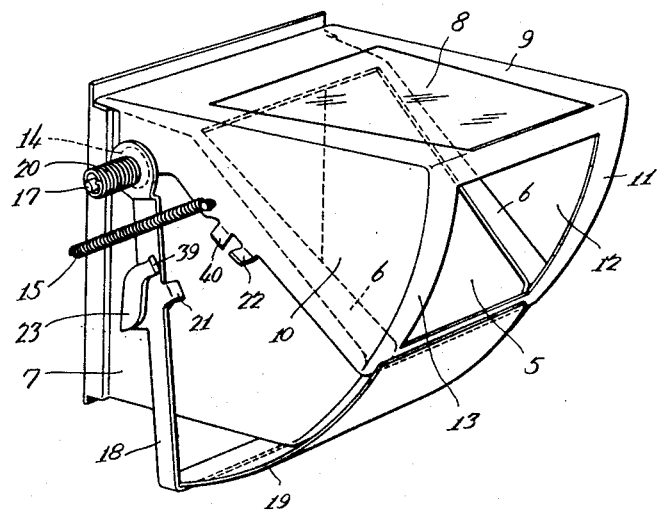
INVENTOR
Jiro Hino
BY Linton and Linton
ATTORNEYS United States Patent Office 2,933,995
Patented Apr. 26, 1960

2,933,995

SHUTTER APPARATUS FOR CAMERAS

Jiro Hino, Kohoku-ku, Yokohama, Japan, assignor to Amano Tokushu Kikai Kabushiki Kaisha, Kohoku-ku, Yokohama, Japan, a corporation of Japan Application April 13, 1956, Serial No. 578,012

Claims priority, application Japan July 5, 1955

2 Claims. (Cl. 95—42)

The present invention relates to shutter apparatus for cameras, and more particularly to a shutter apparatus of a slit type which is characterized in that a covering plate and an intercepting plate are swingably provided and resiliently urged in one direction by respective springs, and after both plates have been swung to their limit positions against the action of their respective springs in relation to the shutter release operation such as the depression of a shutter-button, first the intercepting plate swings first to return towards its original position under the influence of its spring for opening an exposure aperture, then the covering plate also swings to return under the influence of its spring for closing said aperture.

An object of the present invention is to provide an apparatus in which any desired exposing time may be obtained correctly by merely controlling the return movement of a covering plate thereof. Another object of the invention is to provide an improved shutter apparatus which is simple in construction, easy to operate and accurate in operation. Further another object of the invention is to provide a shutter apparatus which may easily be utilized also as an apparatus for operating a viewing mirror for a single-lens reflex camera and, therefore, may be applied to such a camera extremely advantageously.

Other and further objects of the invention will be made clear by the following description of the embodiments shown on the accompanying drawings, in which:

Fig. 3 is a perspective view of the present shutter when partially open.

Fig. 4 is a sectional side view of said shutter.

Fig. 7 is a rear side view of revolving cam parts.

Figure 1:
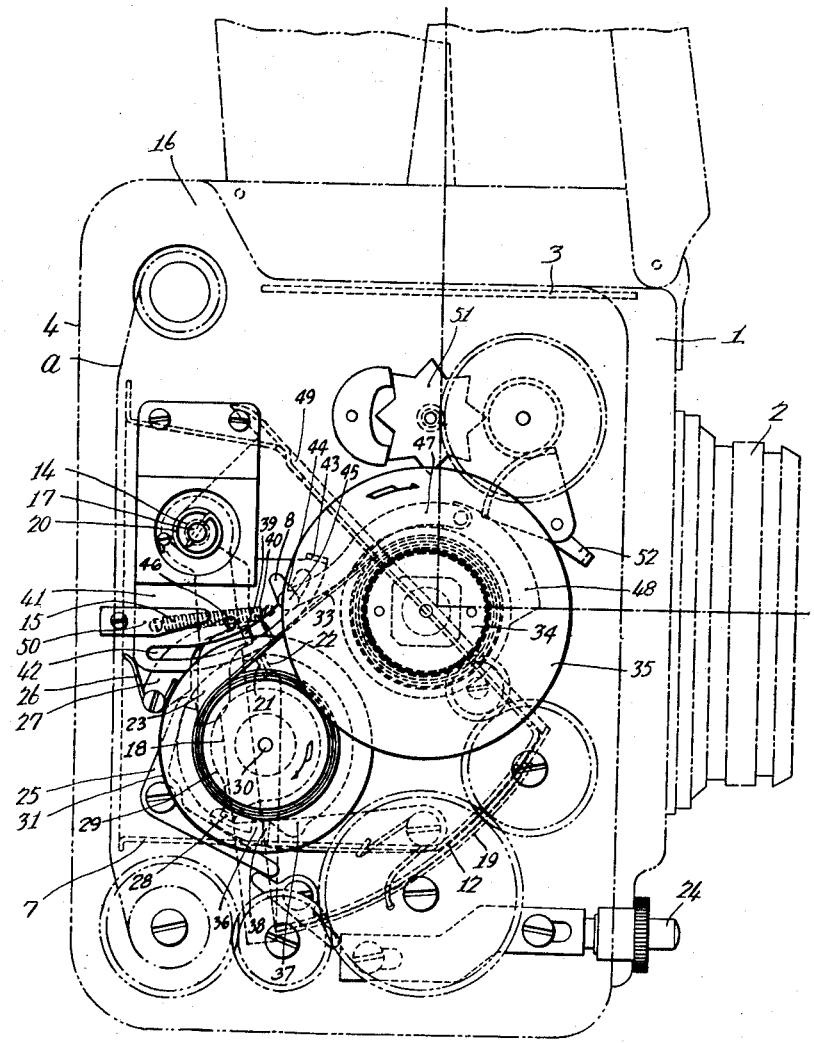
Fig. 1 is a side view of the apparatus of the present invention as applied to a single-lens reflex camera.
Figure 2:
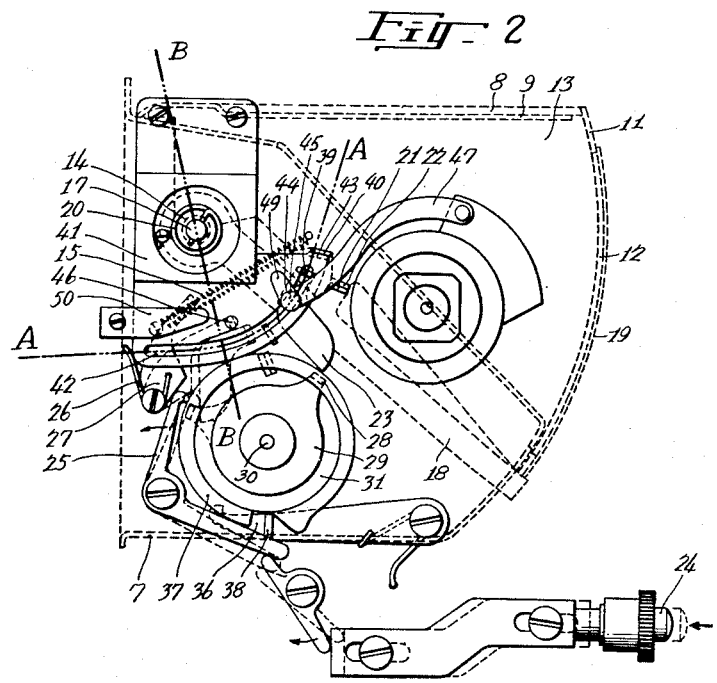
Fig. 2 is a side view of the present shutter controls.
Figure 5:
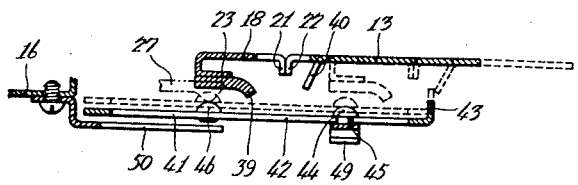
Fig. 5 is a section along the line A—A in Fig. 2.
Figure 6:
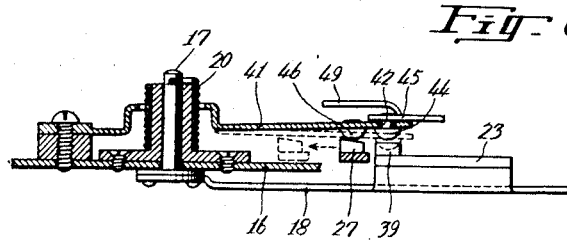
Fig. 6 is a section along the line B—B in Fig. 2.

Referring now more particularly to the accompanying drawings, wherein like and corresponding parts are designed by similar reference characters, numeral 1 is a box with the objective 2 on its front and the finder glass 3 on its top. 4 refers to a detachable back-cover thereof and the film A may move along on the front of said cover 4. The inner housing 7 has the stopping plane portion 6 inclined at about 45 degrees, through which plane portion 6 extends the exposure aperture 5. Said housing is fixed in the box 1 in such a manner that said aperture 5 is placed between the objective 2 and the plane of the film A at an incline of about 45 degrees to the axis of the objective 2. The swingable frame 13 comprising the covering plate 9, on which is fixed the viewing mirror 8, for opening and closing the exposure aperture 5, has a pair of side plates 10 projecting downwards as one body from both side edges of the plate 9 and the curved front plate 11 projecting as one body from the front edge of the plate 9 and being provided with the exposure opening 12 therein is pivotally attached to the upper corners of the side surfaces of the housing 7 with the axes 14 placed at the end of each side plate 10 so that the frame 13 may move up and down about the axes 14 along by the outside of the housing 7, and further the frame 13 is pulled down by the returning spring 15 to the position where its covering plate 9 is in contact with and rests on the stopping plane portion 6 of the housing 7. During the time when the plate 9 rests on the plane portion 6, the surface of the viewing mirror 8 is placed at an incline of about 45 degrees to the axis of the objective 2 behind the same and the exposure aperture 5 on the plane portion 6 is covered with said plate 9, so that light coming in through the objective 2 is reflected by the mirror 8 to make an image on the finder glass 3 without passing through the aperture 5 for reaching the surface of the film A.

The swingable arm 18, which is pivotally attached at the end thereof to the attaching side wall 16 in the box 1 with the axis 17 placed almost on the same line as the axes 14, is extended forwards along the side surface of the inner housing 7 beneath the side plate 10 of the swingable frame 13, and the curved intercepting plate 19 is fixed to the top end of the arm 18 so that it may move up and down together with the arm 18 along the front surface of the swingable frame 13 to close and open the opening 12 when in its elevated position or the front of the aperture 5, and further the axis 17 is resiliently turned by the spring 20 so that the arm 18 and the plate 19 may be urged resiliently downwards. The swingable arm 18 and the swingable frame 13 are provided with the engaging pieces 21 and 22 correspondingly, so when the arm 18 is moved upwards against the action of the returning spring 20 the piece 22 is pushed up by the other piece 21 and the frame 13 is driven upwards together against the action of the spring 15, whereby the covering plate 9 placed over the aperture 5 is also elevated for opening the same. During this upward travel of both the frame 13 and the arm 18, however, the exposure aperture 5 is shut off at its front from the objective 2 by the intercepting plate 19 since the opening 12 which moves upwards in front of the aperture 5 is kept closed by the plate 19 which also moves upwards together with the opening 12, so the light coming in through the objective 2 does not enter into the aperture 5.

The engaging projection 23 is mounted on the side surface of the arm 18 at a position near to the end thereof, and the lever 25 which may incline in one direction until moved by the depression of the shutter-button 24 projecting forwards from the front of the box 1, is provided in the rear of said projection 23 of the arm 18 when lowered to its original position, and further the lever 25 supports at its rear end the claw 27 resiliently urged forwards by the resilient piece 26, so by depressing the shutter-button 24 the lever 25 may be inclined in the opposite direction shown by the arrow while pushing the claw 27 against the action of the resilient piece 26.

The revolving cam 29, which may be restrained against turning when its projection 28 is engaged with the top of the lever 25 and may move properly, when said engagement is released, for pushing up the swingable arm 18 against the action of the spring 20 by the engagement of its projection 28 with the engaging projection 23 of the arm 18, is rotatably mounted on the axis 30 on the side wall 16, and the coil spring 32 one end of which is combined with said cam 29, is connected at its other end with the rewinding wheel 31 rotatably mounted on the same axis 30 as above, and further the tape 33 one end of which is fixed to said wheel 31, is combined with the winding wheel 34 rotatably mounted on the side wall 16 at a certain distance from said rewinding wheel 31, the winding wheel 34 being provided with the knob 35. Thus, if the knob 35 is turned in one direction while restraining the revolution of the cam 29 by the engagement between the lever 25 and the projection 28 of the cam 29, the tape 33 is wound up on the winding wheel 34 and the rewinding wheel 31 is turned in one direction, whereby the coil spring 32 is tightened up for giving a resilient torque to the revolving cam 29. Subsequently, if the shutter-button 24 is depressed so that the lever 25 may be inclined so as to be released from its engagement with the projection 28 of the cam 29, the revolving cam 29 starts to turn in one direction under the influence of the resilient torque and its projection 28 engages with and pushes up the engaging projection 23 of the swingable arm 18, whereby the arm 18 is driven upwards against the action of the spring 20 and, following this movement, the swingable frame 13 also moves upwards against the action of the spring 15, and when the projection 28 is turned at a certain angle to the position where its engagement with the engaging projection 23 of the arm 18 is released, the arm 18 immediately starts to return downwards by the action of the spring 20. Besides, the ring 37 with the recess 36 is fixed on the rewinding wheel, while the restraining piece 38 is resiliently pressed on said ring 37, so that the rewinding wheel 31 is restrained in its revolution by the engagement of the recess 36 with the piece 38 when the wheel 31 has been turned forming a certain angle against the action of the coil spring 32. Further, the turning movement of the knob 35 is utilized as the motion for winding up the film A.

The pushing claw 39 is mounted on the top of the engaging projection 23 of the swingable arm 18, the catching claw 40 is provided on the surface of the side plate 10 of the swingable frame 13, and the restraining plate 41, which is made of a resilient material and is fixed at its base part to the side wall 16, is placed along by the outside of the locuses of both claws 39 and 40 at a slight distance therefrom. Further, the curved guide groove 42 running along the locus of the pushing claw 39 is provided in said restraining plate 41. The restraining claw 43 which may engage with the catching claw 40 of the swingable frame when the frame has been elevated to its limit position, is projected inwards from the end of the plate 41, and the speed-control piece 45 on the inside surface of which is mounted the catching piece 44 is loosely and non-detachably fitted in said groove 42. Furthermore, the protuberance 46 is provided on the inside surface of the restraining plate 41 and the claw 27 which has been mentioned before is positioned by the inside of the plate 41 so that the plate 41 may be pushed out against its own resilience at such time as when the claw 27 is engaged with the protuberance 46 and may move inwards automatically through its own resilience when the said engagement is released by the inclination of the claw 27 consequent on the depression of the shutter-button 24.

The speed-control piece 45 is connected through the link 47 to the adjusting ring 48 loosely mounted on the axis of the knob 35 so that the piece 45 may be moved along in the guide groove 42 at will to provide the desired shutter-speed by merely turning the said ring 48. Further, the engaging plate 49 is projected as one body from the piece 45 so that it may engage with the guide plate 50 projected from the box side by moving it towards "the slow-speed range" lying towards the left in the drawings. When this engagement has been completed, the restraining plate 41 is restricted in such a manner that it does not move inwards but remains in its pushed out position even when the pushing force of the claw 27 is removed by the releasement of the engagement of the claw 27 with the protuberance 46.

In the drawings, numeral 51 is a governor device which may operate only when the adjusting ring 48 is turned to "the slow-speed shutter range," and 52 shows an engaging arm wherewith the governor device 51 may be engaged with the swingable frame 13.

Now, in this apparatus constructed as described above, if the knob 35 is turned in one direction, the winding wheel 31 is turned by means of the tape 33 and the coil spring 32 is gradually wound up for giving a resilient torque to the revolving cam 29 which is restrained in its revolution by the engagement between the projection 28 and the lever 25. In this state, if the shutter-button 24 is depressed, the lever 25 is inclined to be released from its engagement with the projection 28 of the cam 29, and the cam 29 starts to turn in one direction and at the same time the claw 27 is inclined for being separated from the protuberance 46 and the restraining plate 41 becomes free from the pushing force of the claw 27 and moves inwards. Consequently, the projection 28 of the cam 29 engages with the engaging projection 23 of the swingable arm 18 and pushes up said arm 18 against the action of the spring 20 and at the same time the swingable frame 13 also is pushed up against the action of the spring 15, so the covering plate 9 of the frame 13 is separated upwards from the stopping plane 6 for opening the aperture 5 thereon. In this case, however, the aperture 5 is shut off from the objective 2 by the intercepting plate 19 since the opening 12 of the frame 13 which moves upwards in front of the aperture 5 is kept together with the plate 19, so the film A is not yet exposed.

When the cam 29 has been turned at a given angle, the engagement of the projection 28 thereof with the engaging projection 23 of the swingable arm 18 is released after both the frame 13 and the arm 18 have been elevated to their limit positions, and the arm 18, only, immediately starts to move downwards through the action of the spring 20 while the frame 13 is stopped in its upper limit position by the engagement of its catching claw with the restraining claw 43 of the restraining plate 41 which has been deprived of the pushing action of the claw 27 and has been moved inwards. By this down motion of the swingable arm 18, the intercepting plate 19 of the arm 18 is lowered away from the front of the opening 12 placed in front of the aperture 5, so said opening 12 is opened and the light coming in through the objective 2 passes through both the opening 12 and the aperture 5 and reaches the surface of the film A for exposing the same. When the arm has been swung down at a certain angle to the position where the pushing claw 39 thereof engages with and pushes out the catching piece 44 of the speed-control piece 45 placed in a proper position in accordance with a desired exposing time, the restraining plate 41 is moved outwards by said engagement, whereby the engagement of the restraining claw 43 of the plate 41 with the catching claw 40 of the swingable frame 13 is released and the frame 13 starts to return after the swingable arm 18 through the action of the spring 15. Thus, the swingable arm 18 and the frame 13 are lowered and the aperture 5 on the stopping plane portion 6 of the inner housing 7 is closed by the covering plate 9 of the frame 13 which has been returned to its original position. In this manner, the exposure ends completely and all parts come back to their original positions so that the next operation same as above may be performed again.

The above description has been made only in connection with the case of "high-speed shutter" and in this case the shutter speeds may be changed at will by merely changing the position of the speed-control piece 45, but "the bulb operation" may be performed also in this apparatus by way of moving the piece 45 further towards "the slow-speed shutter range," which is further left-below in the drawings, to the position where it cannot be engaged with the swingable arm 18 even when the arm 18 has been lowered to its original position. Furthermore, if the speed-control piece 45 is moved further left-below in the drawings to "the slow-speed shutter range" where its engaging plate 49 engages with the guide plate 50, the restraining plate 41 does not move inwards but remains in its pushed out position even when the shutter-button 24 is depressed and the clam 27 is inclined and so the restraint of the swingable frame 13 in its limit position by the restraining claw 43 of the plate 41 is prevented. In this case, the governor device 51 becomes operatable and by this device the return movement of the frame 13 is controlled so that the slow-speed shutter may be operated.

In every case mentioned above, the viewing mirror 8 fixed on the covering plate 9 naturally moves up and down in accordance with the motion of the swingable frame 13. Therefore, in this apparatus, the mirror 8 may move upwards from its viewing position towards its inoperative position shortly before the beginning of the exposure and may stop in its inoperative position silently without shaking the camera which is one of the main causes for blurred pictures, and also may return to its original position quickly at the same time with the end of the exposure for providing an image on the finder glass 3 again. Besides, the swingable frame 13 of the type comprising the covering plate 9, the side plates 10 and the front plate 11 with the opening 12 is adopted in the embodiment shown on the drawings, but the frame 13 having neither the front plate 10 nor the side plates 11 may be used without changing the effects of the apparatus. Furthermore, it will easily be understood that when the mirror 8 is closely fixed onto the covering plate 9 the parts covered with said mirror 8 is not necessary and such parts of the plate 9 can be cut out for the purpose of decreasing the weight of the swingable frame 13, as shown in the drawings.

It is to be understood that the foregoing description is given merely by way of illustration and that many variations may be made therein without departing from the spirit of my invention.

What I claim is:

1. A shutter apparatus for cameras comprising an inner housing mounted in said camera having a plane portion extending on an incline relative to the objective of said camera and an opening in said housing plane portion for exposing film in said camera, a first member pivotally connected to said inner housing for closing and exposing said housing plane portion opening, a curved member pivotally mounted for movement between said housing opening and said camera objective, a driven rotatable cam for moving said curved member only to a position for closing said housing opening, means for connecting said members only during the movement of said curved member for moving said first member therewith until said first member exposes said housing opening, resilient means tending to move said first member to its housing opening closing position, resilient means tending to move said curved member from its housing opening closing position, and an adjustable mechanism including a resilient plate, a catching claw on said first member, a restraining claw on said plate positioned for engaging said catching claw and retaining said first member in its housing opening exposing position, a speed control piece adjustably mounted on said plate, a pushing claw carried by said curved member and positioned for engaging said speed control piece upon the return movement of said curved member moving said plate restraining claw from said catching claw relieving said first member which returns to its housing opening closing position, providing a given delayed movement to said first member for exposing said housing opening until closed by said first member.

2. A shutter apparatus for cameras comprising an inner housing mounted in said camera having a plane portion extending on an incline relative to the objective of said camera and an opening in said housing plane portion for exposing film in said camera, a first member pivotally connected to said inner housing for closing and exposing said housing plane portion opening, a curved member pivotally mounted for movement between said housing opening and said camera objective, a driven rotatable cam for moving said curved member only to a position for closing said housing opening, means for connecting said members only during the movement of said curved member for moving said first member therewith until said first member exposes said housing opening, resilient means tending to move said first member to its housing opening closing position, resilient means tending to move said curved member from its housing opening closing position, and an adjustable mechanism including a resilient plate, a catching claw on said first member, a restraining claw on said plate positioned for engaging said catching claw and retaining said first member in its housing opening exposing position, a speed control piece adjustably mounted on said plate, a pushing claw carried by said curved member and positioned for engaging said speed control piece upon the return movement of said curved member moving said plate restraining claw from said catching claw relieving said first member which returns to its housing opening closing position, a pivotal lever having an end projection, a projection on said plate for being engaged by said lever projection moving said plate from said members, a spring tending to urge said lever into its plate engaging position and manually operable means for releasing said lever from engagement with said plate permitting said plate to return to its position for engaging said members.

References Cited in the file of this patent

UNITED STATES PATENTS

| | | |
|---|---|---|
| 1,352,449 | Harris | Sept. 14, 1920 |
| 2,016,058 | Steiner | Oct. 1, 1935 |
| 2,338,657 | Mihalyi | Jan. 4, 1944 |
| 2,503,777 | Stoiber | Apr. 11, 1950 |

FOREIGN PATENTS

| | | |
|---|---|---|
| 168,369 | Austria | May 25, 1951 |
| 614,694 | Germany | June 15, 1935 |
| 623,093 | Germany | Dec. 13, 1935 |